(12) United States Patent
Zaumen et al.

(10) Patent No.: US 7,234,003 B2
(45) Date of Patent: Jun. 19, 2007

(54) METHOD AND APPARATUS TO FACILITATE DIRECT TRANSFER OF DATA BETWEEN A DATA DEVICE AND A NETWORK CONNECTION

(75) Inventors: William T. Zaumen, Palo Alto, CA (US); Andy A. Poggio, Palo Alto, CA (US); David Robinson, Austin, TX (US); Leo A. Hejza, Sunnyvale, CA (US)

(73) Assignee: Sun Micorsystems, Inc., Santa Clara, CA (US)

( * ) Notice: Subject to any disclaimer, the term of this patent is extended or adjusted under 35 U.S.C. 154(b) by 1359 days.

(21) Appl. No.: 10/021,913

(22) Filed: Dec. 10, 2001

(65) Prior Publication Data

US 2003/0108070 A1    Jun. 12, 2003

(51) Int. Cl.
G06F 15/16 (2006.01)
(52) U.S. Cl. ................................ 709/250; 709/231
(58) Field of Classification Search ............... 709/250, 709/231
See application file for complete search history.

(56) References Cited

U.S. PATENT DOCUMENTS

| | | | | |
|---|---|---|---|---|
| 3,990,050 A * | 11/1976 | Kolettis et al. | ............... | 710/23 |
| 4,313,160 A * | 1/1982 | Kaufman et al. | ............. | 710/23 |
| 5,675,738 A * | 10/1997 | Suzuki et al. | ................ | 709/219 |
| 5,875,300 A | 2/1999 | Kamel et al. | ................ | 709/219 |
| 5,913,028 A | 6/1999 | Wang et al. | ............ | 395/200.33 |
| 6,026,097 A * | 2/2000 | Voois et al. | ................. | 370/468 |
| 6,094,684 A * | 7/2000 | Pallmann | .................... | 709/227 |
| 6,226,680 B1 | 5/2001 | Boucher et al. | ............ | 709/230 |
| 6,393,487 B2 * | 5/2002 | Boucher et al. | ............ | 709/238 |
| 6,523,093 B1 * | 2/2003 | Bogin et al. | ................. | 711/137 |
| 7,024,479 B2 * | 4/2006 | Shah et al. | ................. | 709/227 |
| 2001/0013123 A1 | 8/2001 | Freeman et al. | ............... | 725/34 |
| 2001/0037406 A1 | 11/2001 | Philbrick et al. | ........... | 709/250 |
| 2001/0046372 A1 * | 11/2001 | Astle et al. | .................... | 386/83 |

(Continued)

OTHER PUBLICATIONS

Publication entitled "Interoperation of Copy Avoidance in Network and File I/O," by Jose Carlos Brustoloni, 1999 IEEE, pp. 534-542.
Publication entitled "Operating System Support for Multimedia Systems," by T. Plagemann et al., 2000 Elsevier Science B. V., Computer Communications 23, pp. 267-289, www.elsevier.com/locate/comcom.

(Continued)

Primary Examiner—Jason Cardone
Assistant Examiner—Thomas Duong
(74) Attorney, Agent, or Firm—Park, Vaughan & Fleming LLP; Edward J. Grundler

(57) ABSTRACT

One embodiment of the present invention provides a system that facilitates transferring data between a data device and a data terminal across a network. The system initializes itself by establishing connections between the controller, multiplexer, and data device. The system operates by receiving a request at a multiplexer from a controller to transfer data from the data device to the data terminal. The multiplexer forwards this request to the data device that has the requested data. The multiplexer then receives a set of parameters from the data device, including the location of the outgoing data within the data device. The multiplexer moves the data from the data device into an outgoing data stream, thereby removing the necessity of first copying the data into the controller.

28 Claims, 6 Drawing Sheets

U.S. PATENT DOCUMENTS

| | | | |
|---|---|---|---|
| 2002/0026502 A1* | 2/2002 | Phillips et al. | 709/219 |
| 2002/0059451 A1 | 5/2002 | Haviv | 709/238 |
| 2002/0066101 A1* | 5/2002 | Gordon et al. | 725/43 |
| 2002/0124108 A1 | 9/2002 | Terrell et al. | 709/245 |
| 2002/0188740 A1 | 12/2002 | Tang et al. | 709/230 |
| 2003/0025832 A1* | 2/2003 | Swart et al. | 348/461 |
| 2003/0208570 A1 | 11/2003 | Lapidous | 709/222 |

OTHER PUBLICATIONS

Publication entitled "DAFS-Enabling Data Center Applications," by Jeffrey Carter et al., Dec. 2000, XP-002237620, pp. 1-5.

Publication entitled "Design and Implementation of a Direct Access File System (DAFS) Kernal Server for FreeBSD," by Kostas Magoutis, Harvard University, XP-002237619, pp. 1-24.

* cited by examiner

METHOD AND APPARATUS TO FACILITATE DIRECT TRANSFER OF DATA BETWEEN A DATA DEVICE AND A NETWORK CONNECTION

BACKGROUND

1. Field of the Invention

The present invention relates to data transfer on a network. More specifically, the present invention relates to a method and an apparatus to facilitate direct transfer of data between a data device and a network connection.

2. Related Art

Modern computing systems, coupled with the Internet, allow computer users to access a seemingly limitless supply of data. Typically, the computer user accesses data on the Internet using a data terminal such as a web browser. This data terminal, in turn, communicates with one or more applications such as web servers to retrieve the data.

These applications, however, can encounter performance problems when multiple data terminals simultaneously access the same server or when high bandwidth applications such as database backups are running. Simultaneous access by multiple data terminals causes a significant amount of data motion between the application and the data device supplying or receiving the data. Typically, the application receives a request from a data terminal to supply data to the data terminal. In response to a request, the application locates the proper data device, copies the data into the application's data space, and then sends the data within transmission control protocol (TCP) or user datagram protocol (UDP) packets to the data terminal.

Data can also be moved in the opposite direction, with data within TCP or UDP packets originating at the data terminal for delivery to a data device. This data is first received into the application's data space, and then the application moves the data to the data storage device or other device needing the data.

Copying data into and out of the application's data space during these data transfer operations is time consuming and uses a significant amount of the bandwidth available to the application and other applications, which may be running on the same computing device.

What is needed is a method and an apparatus that facilitates moving data between a data device and a data terminal without the disadvantages listed above.

SUMMARY

One embodiment of the present invention provides a system that facilitates transferring data between a data device and a data terminal across a network. The system initializes itself by establishing connections between the controller, multiplexer, and data device. The system operates by receiving a request at a multiplexer from a controller to transfer data from the data device to the data terminal. The multiplexer forwards this request to the data device that has the requested data. The multiplexer then receives a set of parameters from the data device, including the location of the outgoing data within the data device. The multiplexer moves the data from the data device into an outgoing data stream, thereby removing the necessity of first copying the data into the controller.

In one embodiment of the present invention, the transmission protocol for the outgoing data stream includes transmission control protocol (TCP) or user datagram protocol (UDP).

In one embodiment of the present invention, the system receives a request at the multiplexer to transfer data from the data terminal to the data device. The multiplexer forwards this request to the data device that will receive the data. The multiplexer then accepts a set of parameters from the data device, including the location for storing the incoming data within the data device. The multiplexer recovers data from an incoming data stream. This recovered data is moved directly to the data device, removing the necessity of first copying the data into the controller.

In one embodiment of the present invention, the transmission protocol for the incoming data stream includes TCP or UDP.

In one embodiment of the present invention, the data device includes a hard disk, a floppy disk, a tape drive, a compact disk, a digital versatile disk, a digital video disk, a web camera, or a streaming data source.

In one embodiment of the present invention, the data device comprises a component associated with a computer kernel process.

In one embodiment of the present invention, the data device comprises a component associated with a computer application program.

In one embodiment of the present invention, the data device comprises a data source component separate from a computer system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer Systems.

Figure 1:
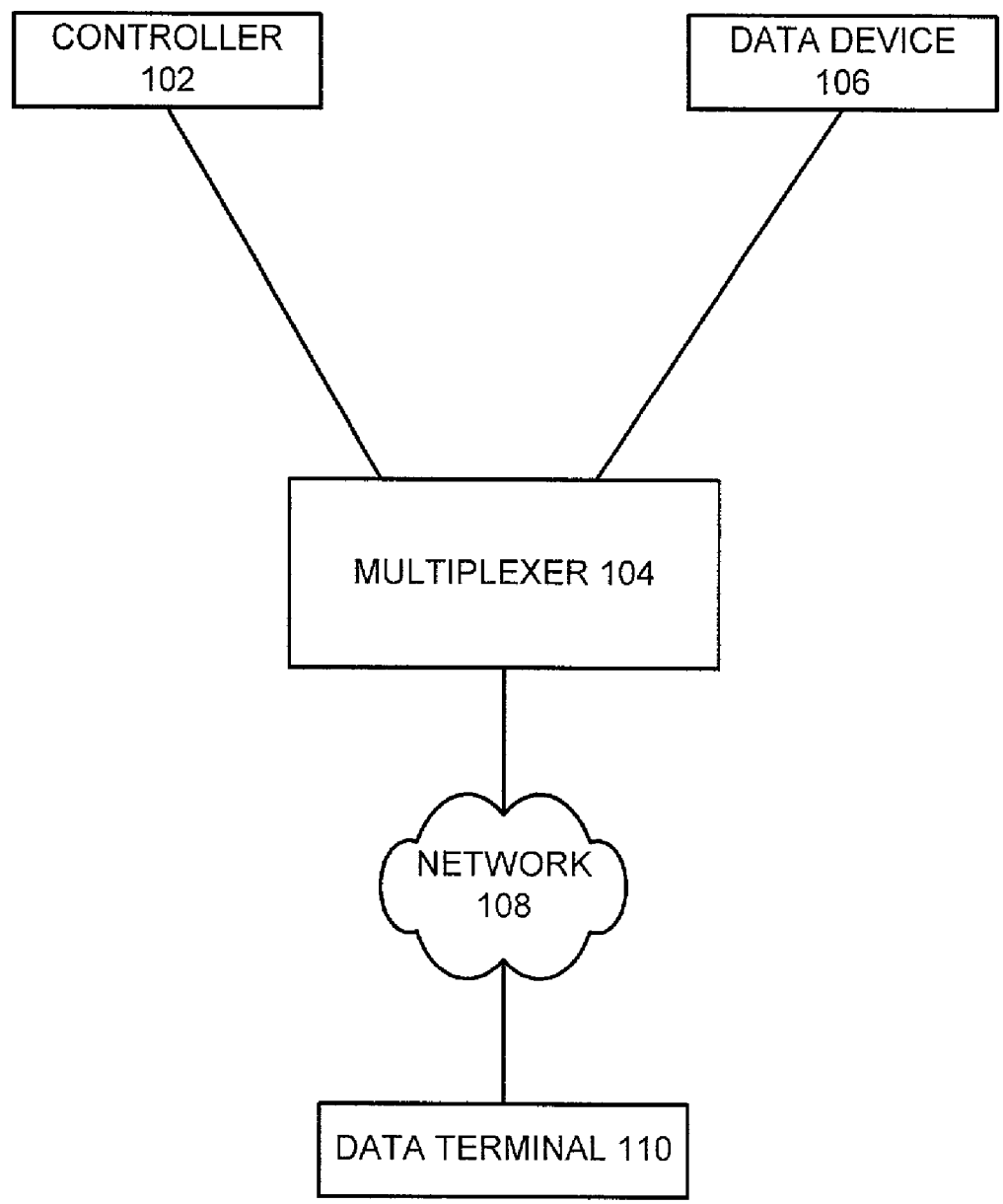
FIG. 1 illustrates computer systems coupled together in accordance with an embodiment of the present invention.

FIG. 1 illustrates computer systems coupled together in accordance with an embodiment of the present invention. Controller 102 and data device 106 are coupled to multiplexer 104. Data terminal 110 is coupled to multiplexer 104 across network 108. Controller 102 is a process or thread that uses data to network direct (DND) services to direct data associated with a socket to or from DND data providers. Controller 102 can include such processes as web servers, file transfer protocol (ftp) servers, and network file system (NFS) servers.

Data device 106 is a process or kernel service that acts as a source or a sink for data. Data device 106 can include magnetic, optical, and magneto-optical storage devices, storage devices based on flash memory and/or battery-backed up memory, as well as streaming data sources such as web cameras and the like. Upon completion of a data transfer, data device 106 sends a "return" or completion message to multiplexer 104, which is then forwarded to controller 102.

Multiplexer 104 is a driver or device that collects or distributes data traffic from or to a data stream such as a network connection. Examples of multiplexer 104 include a DND enabled TCP implementation or custom packet accelerating hardware.

Data terminal 110 is a client of controller 102. Data terminal 110 includes web browsers, ftp clients, NFS clients, and the like. Data terminal 110 couples to multiplexer 104 across network 108. Network 108 can generally include any type of wire or wireless communication channel capable of coupling together computing nodes. This includes, but is not limited to, a local area network, a wide area network, or a combination of networks. In one embodiment of the present invention, network 108 includes the Internet.

Data passing between data terminal 110 and either controller 102 or data device 106 will pass through multiplexer 104, which provides the interface between network 108 and an internal network coupling controller 102 and data device 106 to multiplexer 104. Multiplexer 104 will include network interfaces and may terminate TCP and UDP connections.

Multiplexer 104

Figure 2:
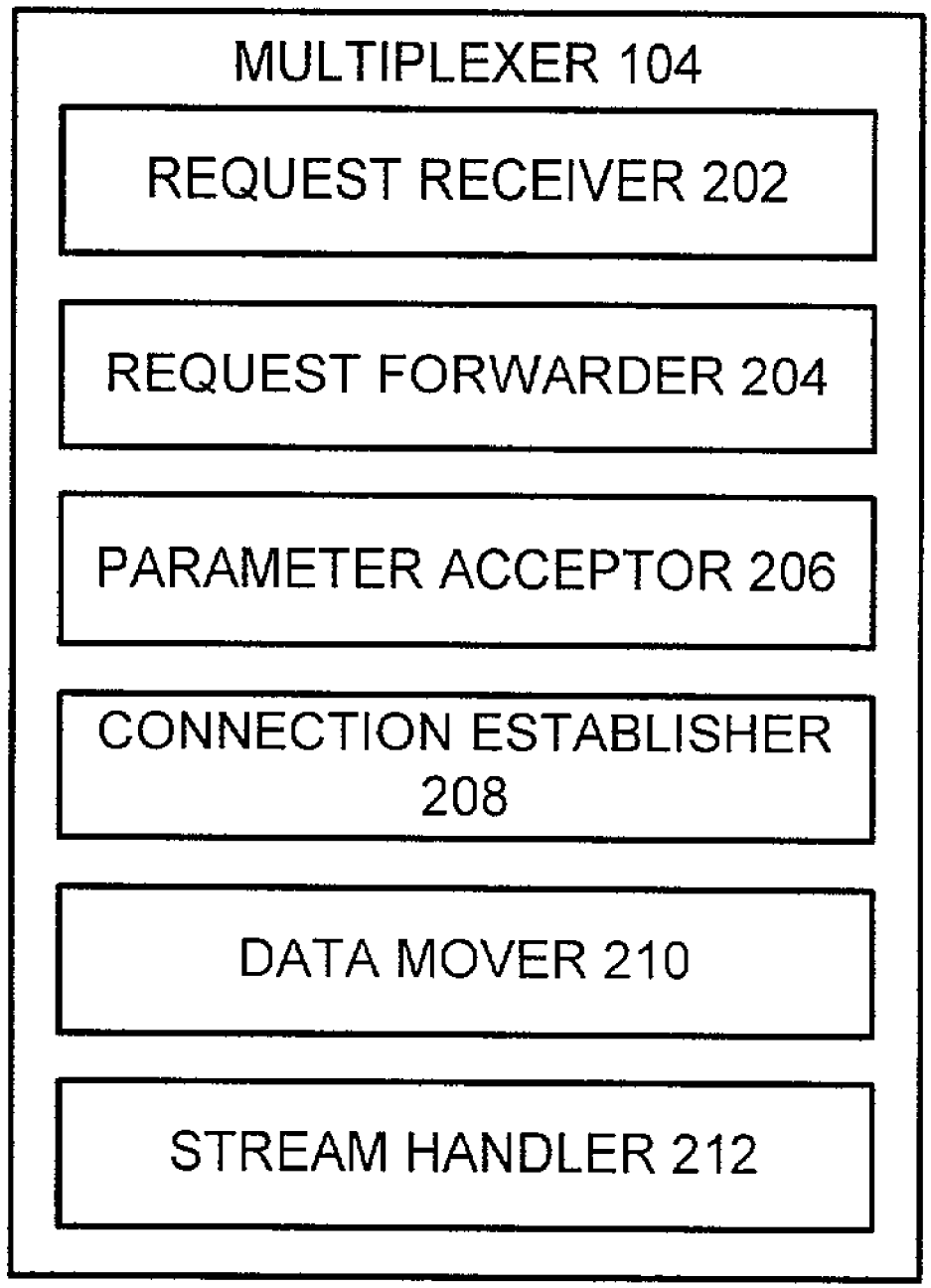
FIG. 2 illustrates multiplexer 104 in accordance with an embodiment of the present invention.

FIG. 2 illustrates multiplexer 104 in accordance with an embodiment of the present invention. Multiplexer 104 includes request receiver 202, request forwarder 204, parameter acceptor 206, connection establisher 208, data mover 210, and stream handler 212.

Request receiver 202 receives requests from controller 102 to transfer data between data device 106 and data terminal 110. These requests may include requests to transfer data from data device 106 to data terminal 110 and requests to transfer data from data terminal 110 to data device 106.

After request receiver 202 receives a request to transfer data, request forwarder 204 forwards the request to data device 106. Note that controller 102 may also include remote direct memory access (RDMA) parameters in a request, so that data device 106 will obtain most of the request data directly from controller 102.

Parameter acceptor 206 accepts a set of parameters from data device 106. This set of parameters is sent in response to data device 106 receiving the request. The set of parameters includes the location within data device 106 where outgoing data resides or where to put incoming data. This set of parameters may include other information such as size of the outgoing data and the like.

Data mover 210 moves data between data device 106 and multiplexer 104 across the RDMA connection. This data can move either direction between data device 106 and multiplexer 104, depending on the request from controller 102. Data completion messages are sent from multiplexer 104 to data device 106 when the data transfer is completed and multiplexer 104 can determine that the data will not have to be transferred again. A data completion message indicates to data device 106 that data device 106 may reclaim resources associated with the set of parameters.

Stream handler 212 handles both outbound and inbound data streams across network 108. For an outbound data stream, stream handler 212 inserts data from data device 106 into the outbound data stream. For example, stream handler 212 inserts data into TCP packets on a TCP connection established by controller 102 between controller 102 and data terminal 110. For an inbound data stream, multiplexer 104 strips incoming data from the inbound data stream and passes it directly to data device 106. Controller 102 is thus relieved of having to copy data into its own memory and subsequently moving the copied data to the proper destination.

Outgoing Message Flow

Figure 3:
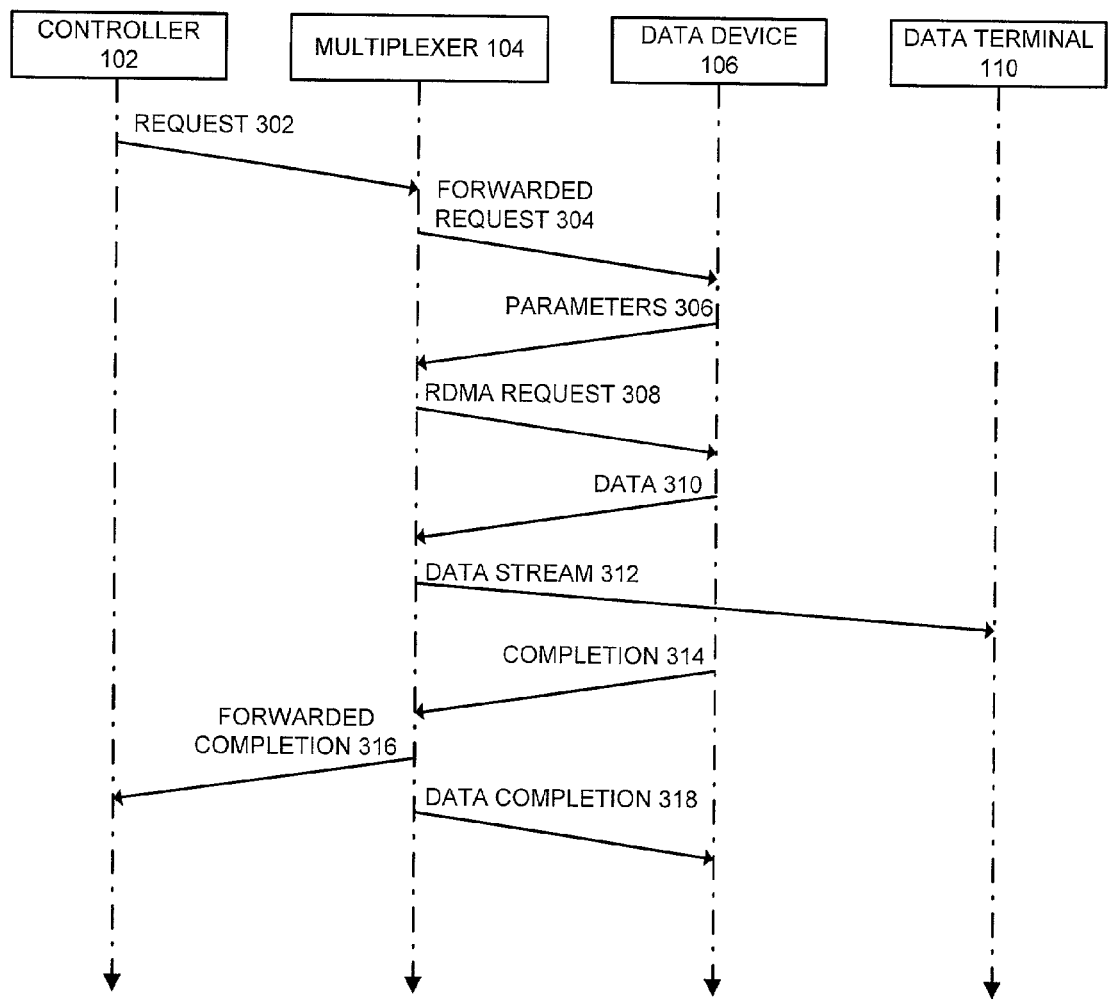
FIG. 3 is an activity diagram illustrating message flow related to time for outgoing data in accordance with an embodiment of the present invention.

FIG. 3 is an activity diagram illustrating message flow related to time for outgoing data in accordance with an embodiment of the present invention. Controller 102 first passes request 302 to multiplexer 104. Multiplexer 104, in turn, sends forwarded request 304 to data device 106.

Data device 106 responds to forwarded request 304 with parameters 306. Parameters 306 includes the location of the outgoing data within data device 106. Multiplexer 104 then establishes RDMA request 308 using parameters 306.

Next, multiplexer 104 initiates an RDMA operation to obtain data 310 from data device 106. Multiplexer 104 then places data 310 into data stream 312 for deliver to data terminal 110. Upon completion of the data transfer, data device 106 sends completion 314 to multiplexer 104. Multiplexer 104 then sends forwarded completion 316 to controller 102. Multiplexer 104 also sends data completion 318 to data device 106. Note that controller 102 will typically block after sending request 302 and will remain blocked until receiving forwarded completion 316. Multiplexer 104 also sends data device 106 data completion messages when resources associated with the set of parameters provided by data device 106 are no longer needed by multiplexer 104.

Incoming Message Flow

Figure 4:
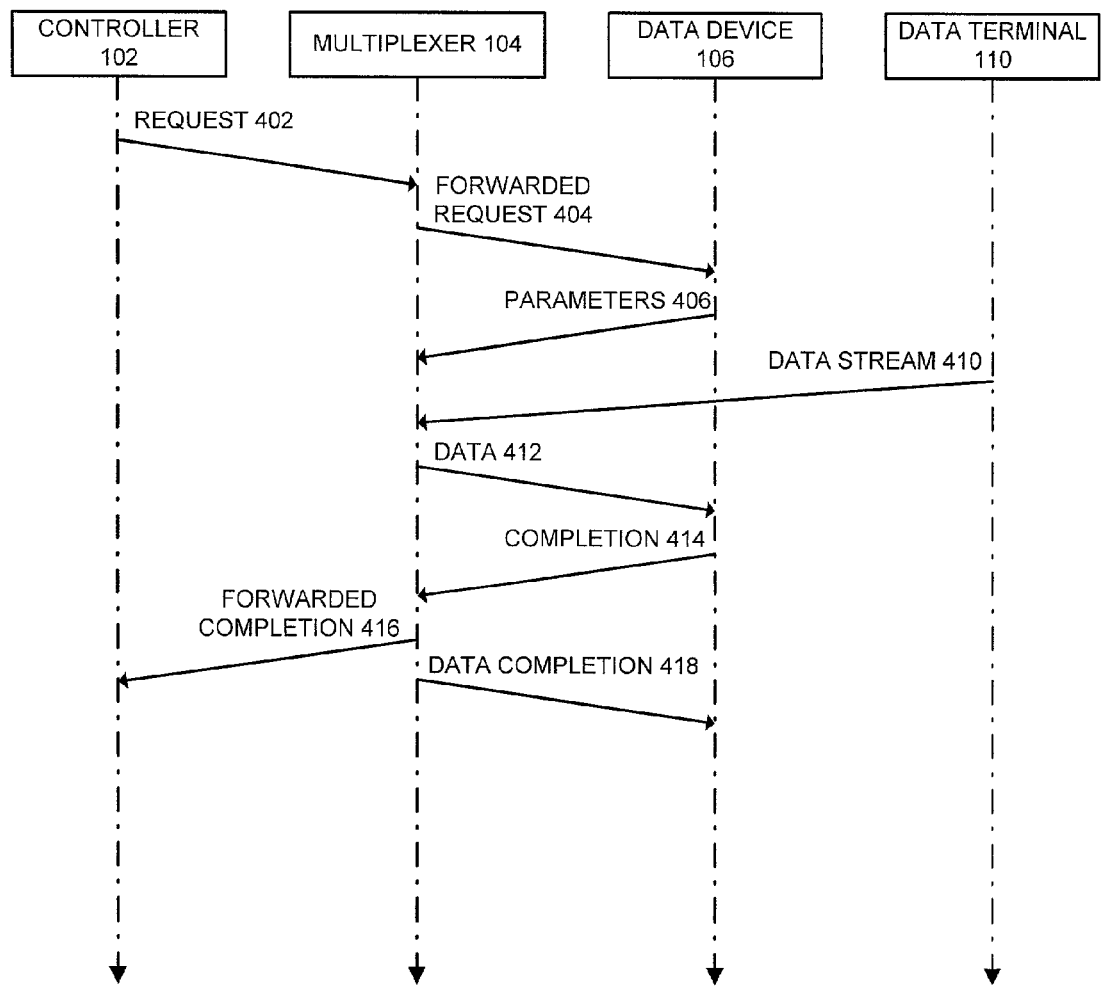
FIG. 4 is an activity diagram illustrating message flow related to time for incoming data in accordance with an embodiment of the present invention.

FIG. 4 is an activity diagram illustrating message flow related to time for incoming data in accordance with an embodiment of the present invention. Controller 102 first passes request 402 to multiplexer 104. Multiplexer 104, in turn, sends forwarded request 404 to data device 106.

Data device 106 responds to forwarded request 404 with parameters 406. Parameters 406 includes the location specifying where to place the incoming data within data device 106.

Multiplexer 104 receives data stream 410 from data terminal 110. Multiplexer 104 then strips the incoming data from data stream 410 and delivers the data to data device 106 as data 412. Upon completion of the data transfer, data device 106 sends completion 414 to multiplexer 104. Multiplexer 104 sends forwarded completion 416 to controller 102. Multiplexer 104 also sends data completion 418 to data device 106. Controller 102 will typically block after sending request 402 and will remain blocked until receiving forwarded completion 416. Multiplexer 104 also sends data device 106 data completion messages when resources associated with the set of parameters provided by data device 106 are no longer needed by multiplexer 104.

Copying Outgoing Data

Figure 5:
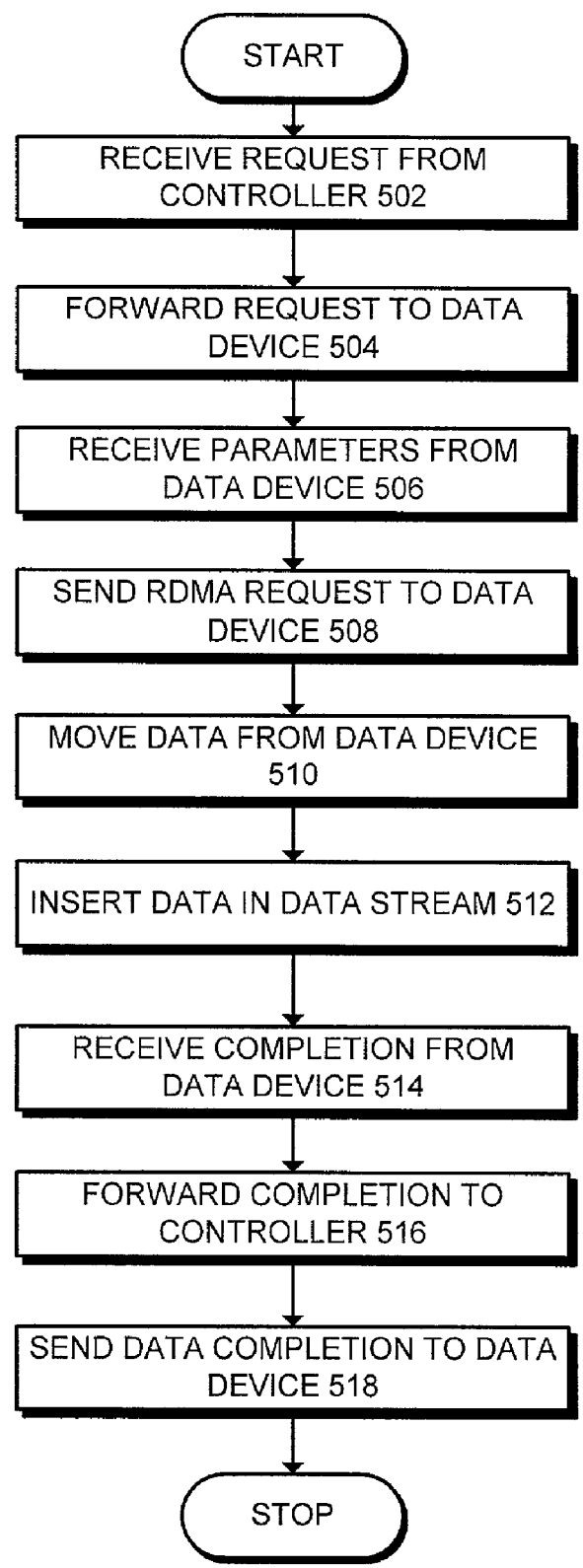
FIG. 5 is a flowchart illustrating the process of copying data into an outgoing message in accordance with an embodiment of the present invention.

FIG. 5 is a flowchart illustrating the process of copying data into an outgoing message in accordance with an embodiment of the present invention. The system starts when multiplexer 104 receives a request from controller 102 to transfer data from data device 106 to data terminal 110 (step 502). Next, multiplexer 104 forwards the request to data device 106 (step 504).

Multiplexer 104 then receives a set of parameters, including the location of the outgoing data, from data device 106 (step 506). Multiplexer 104 then sends an RDMA request to data device 106 (step 508). Multiplexer 104 next moves data from data device 106 across a data connection (step 510). This data connection can include an RDMA connection. Next, multiplexer 104 inserts this data into the outgoing data stream (step 512). Upon completion of the data transfer, multiplexer 104 receives a "return" or completion message from data device 106 (step 514). Next, multiplexer 104 forwards the completion message to controller 102 (step 516). Finally, multiplexer 104 sends a data completion message to data device 106 (step 518).

Copying Incoming Data

Figure 6:
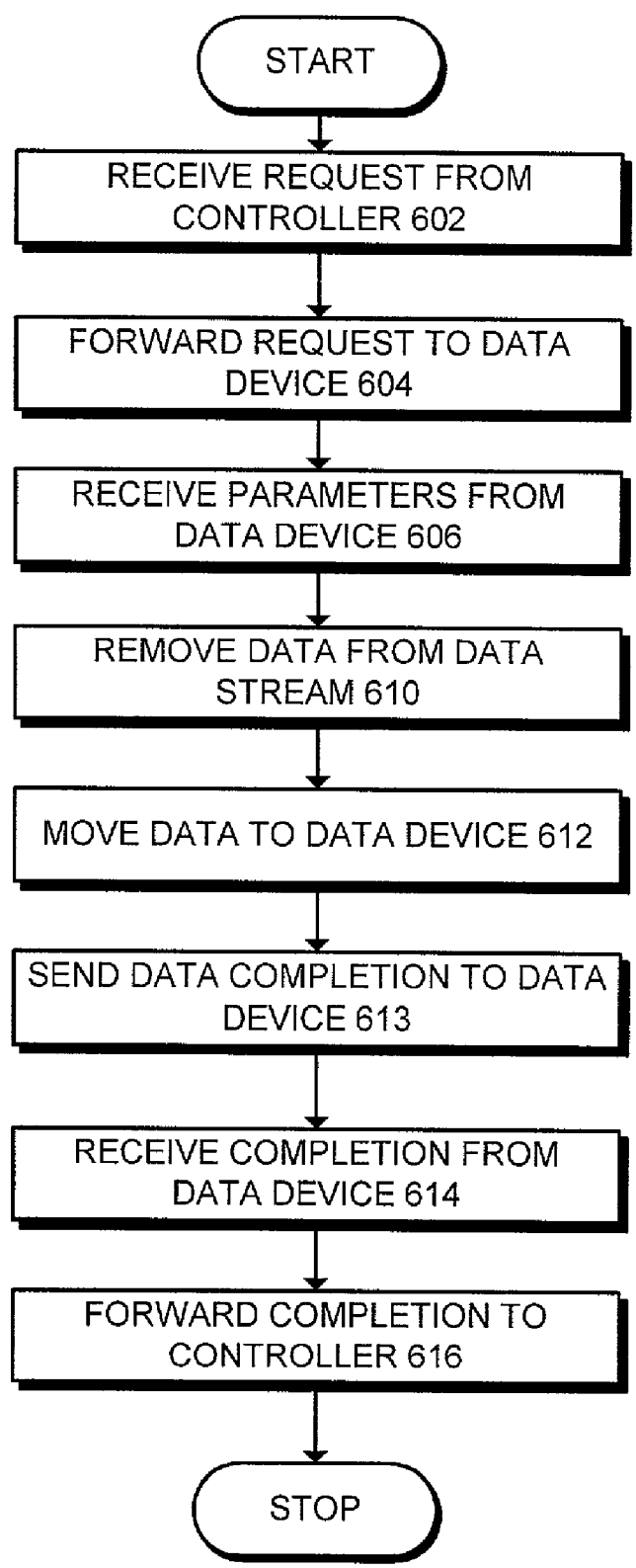
FIG. 6 is a flowchart illustrating the process of copying data from an incoming message in accordance with an embodiment of the present invention.

FIG. 6 is a flowchart illustrating the process of copying data from an incoming message in accordance with an embodiment of the present invention. The system starts when multiplexer 104 receives a request from controller 102 to transfer data to data device 106 from data terminal 110 (step 602). Next, multiplexer 104 forwards the request to data device 106 (step 604).

Multiplexer 104 then receives a set of parameters, including the location where to place the incoming data within data device 106 (step 606). Multiplexer 104 then recovers the data from the incoming data stream (step 610). Next, multiplexer 104 moves the data to data device 106 across a data connection (step 612). This data connection can include an RDMA connection. Then, multiplexer 104 sends a data completion message to data device 106 (step 613). Upon completion of the data transfer, multiplexer 104 receives a "return" or completion message from data device 106 (step 614). Finally, multiplexer 104 forwards the completion message to controller 102 and sends data completion messages to data device 106 to indicate that resources associated with the set of parameters are no longer needed (step 616).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate transferring data between a data device and a data terminal across a network, comprising:
    receiving at a multiplexer a first request from a controller to transfer data from the data device to the data terminal;
    forwarding the first request from the multiplexer to the data device;
    accepting a first set of parameters from the data device at the multiplexer, wherein the first set of parameters includes a location of data to be transferred;
    sending a remote direct memory access (RDMA) request from the multiplexer to the data device;
    in response to the RDMA request, moving data from the data device to the multiplexer; and
    inserting data from the data device into an outgoing data stream, so that data does not have to be copied to the controller for insertion into the outgoing data stream.

2. The method of claim 1, wherein a transmission protocol for the outgoing data stream includes one of transmission control protocol and user datagram protocol.

3. The method of claim 1, further comprising:
    receiving at the multiplexer a second request to transfer data from the data terminal to the data device;
    forwarding the second request from the multiplexer to the data device;
    accepting a second set of parameters from the data device at the multiplexer, wherein the second set of parameters includes a storage location for transferring data to;
    recovering data from an incoming data stream; and
    moving data recovered from the incoming data stream to the data device, so that data does not have to be copied to the controller from the incoming data stream.

4. The method of claim 3, wherein a transmission protocol for the incoming data stream includes one of transmission control protocol and user datagram protocol.

5. The method of claim 3, wherein the data device includes one of a hard disk, a floppy disk, a tape drive, a compact disk, a digital versatile disk, a digital video disk, a web camera, and a streaming data source.

6. The method of claim 5, wherein the data device comprises a component associated with a computer kernel process.

7. The method of claim 5, wherein the data device comprises a component associated with a computer application program.

8. The method of claim 5, wherein the data device comprises a data source component separate from a computer system.

9. A computer-readable storage medium storing instructions that when executed by a computer cause the computer to perform a method to facilitate transferring data between a data device and a data terminal across a network, wherein the computer-readable storage medium includes magnetic and optical storage devices, disk drives, magnetic tape, CDs (compact discs), and DVDs (digital versatile discs or digital video discs), the method comprising:
    receiving at a multiplexer a first request from a controller to transfer data from the data device to the data terminal;
    forwarding the first request from the multiplexer to the data device;
    accepting a first set of parameters from the data device at the multiplexer, wherein the first set of parameters includes a location of data to be transferred;
    sending a remote direct memory access (RDMA) request from the multiplexer to the data device;
    in response to the RDMA request, moving data from the data device to the multiplexer; and
    inserting data from the data device into an outgoing data stream, so that data does not have to be copied to the controller for insertion into the outgoing data stream.

10. The computer-readable storage medium of claim 9, wherein a transmission protocol for the outgoing data stream includes one of transmission control protocol and user datagram protocol.

11. The computer-readable storage medium of claim 9, the method further comprising:
receiving at the multiplexer a second request to transfer data from the data terminal to the data device;
forwarding the second request from the multiplexer to the data device;
accepting a second set of parameters from the data device at the multiplexer, wherein the second set of parameters includes a storage location for transferring data to;
recovering data from an incoming data stream; and
moving data recovered from the incoming data stream to the data device, so that data does not have to be copied to the controller from the incoming data stream.

12. The computer-readable storage medium of claim 11, wherein a transmission protocol for the incoming data stream includes one of transmission control protocol and user datagram protocol.

13. The computer-readable storage medium of claim 11, wherein the data device includes one of a hard disk, a floppy disk, a tape drive, a compact disk, a digital versatile disk, a digital video disk, a web camera, and a streaming data source.

14. The computer-readable storage medium of claim 13, wherein the data device comprises a component associated with a computer kernel process.

15. The computer-readable storage medium of claim 13, wherein the data device comprises a component associated with a computer application program.

16. The computer-readable storage medium of claim 13, wherein the data device comprises a data source component separate from a computer system.

17. An apparatus to facilitate transferring data between a data device and a data terminal across a network, comprising:
a receiving mechanism that is configured to receive at a multiplexer a first request from a controller to transfer data from the data device to the data terminal;
a forwarding mechanism that is configured to forward the first request from the multiplexer to the data device;
an accepting mechanism that is configured to accept a first set of parameters from the data device at the multiplexer, wherein the first set of parameters includes a location of data to be transferred;
a sending mechanism that is configured to send a remote direct memory access (RDMA) request from the multiplexer to the data device;
a moving mechanism that is configured to move data from the data device to the multiplexer in response to the RDMA request; and
a stream handling mechanism that is configured to insert data from the data device into an outgoing data stream, so that data does not have to be copied to the controller for insertion into the outgoing data stream.

18. The apparatus of claim 17, wherein a transmission protocol for the outgoing data stream includes one of transmission control protocol and user datagram protocol.

19. The apparatus of claim 17,
wherein the receiving mechanism is further configured to receive at the multiplexer a second request to transfer data from the data terminal to the data device;
wherein the forwarding mechanism is further configured to forward the second request from the multiplexer to the data device;
wherein the accepting mechanism is further configured to accept a second set of parameters from the data device at the multiplexer, wherein the second set of parameters includes a storage location for transferring data to;
wherein the stream handling mechanism is further configured to recover data from an incoming data stream; and
wherein the moving mechanism is further configured to move data recovered from the incoming data stream to the data device, so that data does not have to be copied to the controller from the incoming data stream.

20. The apparatus of claim 19, wherein a transmission protocol for the incoming data stream includes one of transmission control protocol and user datagram protocol.

21. The apparatus of claim 19, wherein the data device includes one of a hard disk, a floppy disk, a tape drive, a compact disk, a digital versatile disk, a digital video disk, a web camera, and a streaming data source.

22. The apparatus of claim 21, wherein the data device comprises a component associated with a computer kernel process.

23. The apparatus of claim 21, wherein the data device comprises a component associated with a computer application program.

24. The apparatus of claim 21, wherein the data device comprises a component associated with a computer application program.

25. A method to facilitate transferring data between a data device and a data terminal across a network, comprising:
establishing a data session between a controller and the data terminal, wherein the data session is established through a multiplexer;
receiving a first set of data for the data session from the data device in response to a remote direct memory access (RDMA) request from the multiplexer to the data device; and
inserting the first set of data into an outgoing data stream related to the data session, so that the first set of data does not have to be copied to the controller for insertion into the outgoing data stream.

26. The method of claim 25, further comprising:
retrieving a second set of data from an incoming data stream related to the data session; and sending the second set of data to the data device, so that the second set of data does not have to be copied to the controller before being sent to the data device.

27. The method of claim 26, wherein a transmission protocol for the data session includes one of transmission control protocol and user datagram protocol.

28. The method of claim 25, wherein the data device includes one of a hard disk, a floppy disk, a tape drive, a compact disk, a digital versatile disk, a digital video disk, a web camera, and a streaming data source.

* * * * *